(12) United States Patent
Ishikawa

(10) Patent No.: US 7,477,416 B2
(45) Date of Patent: Jan. 13, 2009

(54) PRINTING METHOD AND PRINTING APPARATUS FOR PRINTING ON A LABEL SHEET

(75) Inventor: Kohei Ishikawa, Kanagawa (JP)

(73) Assignee: Canon Finetech Inc., Ibaraki-ken (JP)

( * ) Notice: Subject to any disclaimer, the term of this patent is extended or adjusted under 35 U.S.C. 154(b) by 906 days.

(21) Appl. No.: 10/878,728

(22) Filed: Jun. 29, 2004

(65) Prior Publication Data

US 2005/0018232 A1    Jan. 27, 2005

(30) Foreign Application Priority Data

Jul. 3, 2003    (JP)    ............... 2003-190880

(51) Int. Cl.
*G06K 15/00*    (2006.01)
*G06F 3/12*    (2006.01)

(52) U.S. Cl. ............... 358/1.18; 358/1.13; 358/1.16

(58) Field of Classification Search ............... 358/1.11, 358/1.13, 1.18, 1.1, 1.2, 1.9, 1.5, 1.6, 1.8, 358/1.12, 1.14, 1.15, 1.16, 1.17, 404, 468, 358/444; 715/274; 399/1; 347/2, 3, 5, 23

See application file for complete search history.

(56) References Cited

U.S. PATENT DOCUMENTS 6,134,020 A * 10/2000 Masumoto et al. ......... 358/1.16

| | | | |
|---|---|---|---|
| 6,172,688 B1 | 1/2001 | Iwasaki et al. | |
| 6,236,752 B1 | 5/2001 | Katayama et al. | |
| 6,384,921 B1 | 5/2002 | Saijo et al. | |

FOREIGN PATENT DOCUMENTS

| | | |
|---|---|---|
| DE | 43 09 750 | 9/1994 |
| JP | 2001-10622 | 1/2001 |
| JP | 2002-103709 | 4/2002 |
| JP | 2003-72180 | 3/2003 |

* cited by examiner

*Primary Examiner*—Dov Popovici
(74) *Attorney, Agent, or Firm*—Fitzpatrick, Cella, Harper & Scinto

(57) ABSTRACT

A printing method and apparatus can continuously print on a plurality of labels at a correct position without reducing throughput. Upon printing an image on labels stuck on a roll-shaped continuous sheet with a predetermined interval while reciprocally scanning a printhead, the printing apparatus receives a raster image command from a host and bitmaps raster data to a data buffer having a capacity capable of storing data for a single scan-printing by the printhead, discriminates whether or not raster data to be printed on a plurality of continuous labels can be bitmapped to the data buffer, bitmaps null data for rasters corresponding to a predetermined interval between the labels to the data buffer in accordance with the discrimination result, further discriminates whether or not data for a single scan-printing by the printhead is bitmapped to the data buffer, and prints by scanning the printhead accordingly.

11 Claims, 13 Drawing Sheets

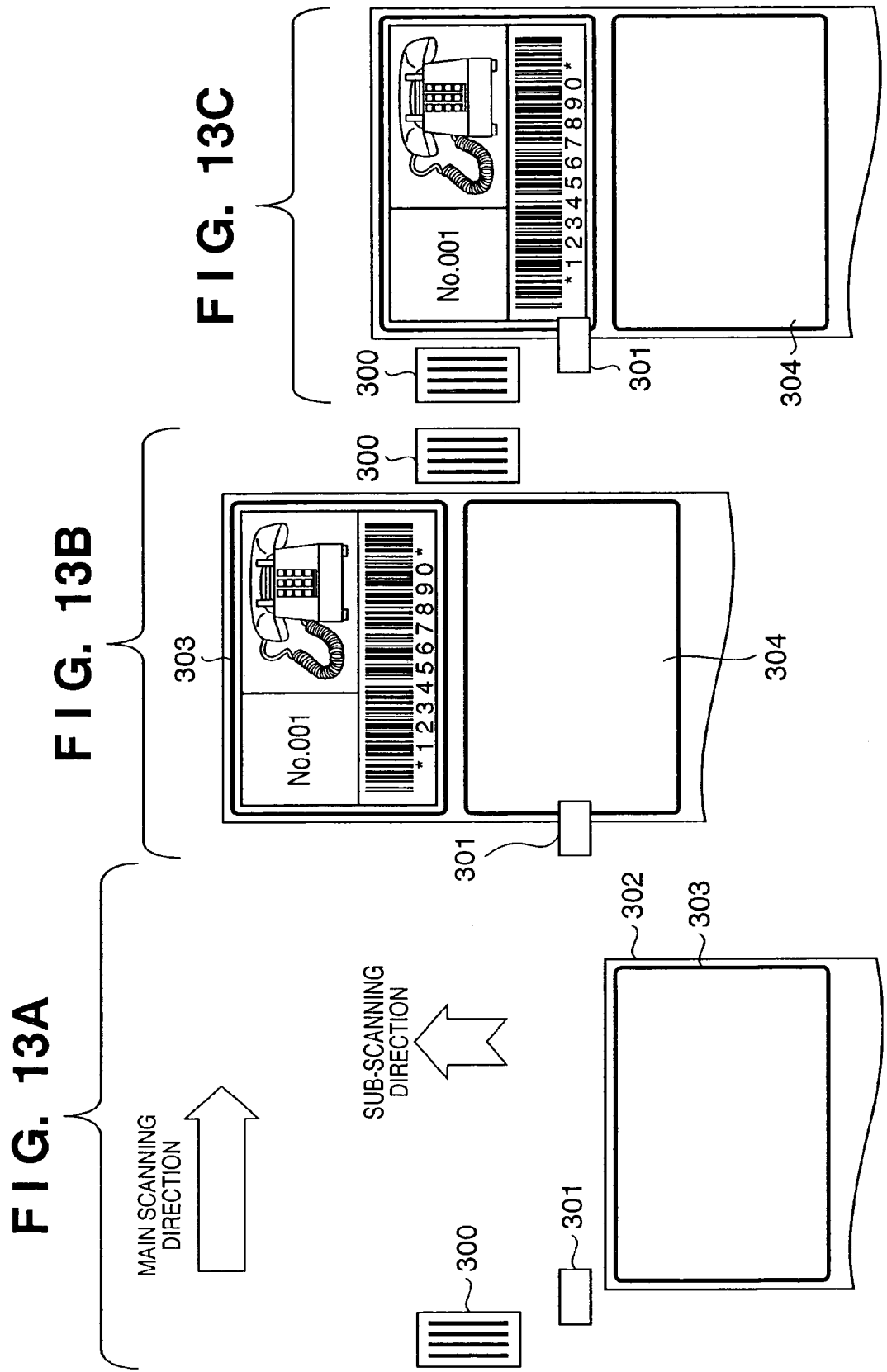

PRINTING METHOD AND PRINTING APPARATUS FOR PRINTING ON A LABEL SHEET

CLAIM OF PRIORITY

This application claims priority from Japanese Patent Application No. 2003-190880, entitled "Printing Method and Printing Apparatus"and filed on Jul. 3, 2003, the entire contents of which are incorporated herein by reference.

FIELD OF THE INVENTION

This invention relates to a printing method and printing apparatus and, more particularly, for example, a printing method and printing apparatus for printing a printing image on a printing medium such as a label paper sheet that is a layout sheet on which a plurality of labels are stuck, by using a serial-scan-type inkjet printhead.

BACKGROUND OF THE INVENTION

By using various methods, an inkjet printing apparatus forms a discharged droplet of ink, and makes this discharged droplet stick to a printing medium such as a printing paper sheet to print. More specifically, the inkjet printing apparatus (to be referred to as a printing apparatus hereinafter) which uses thermal energy for forming the discharged droplet has good features in which a plurality of orifices are easily arranged at high density, a high-resolution and high-quality image can be obtained at high speed in this high-density arrangement, and a color image can also be obtained easily.

In actual printing processing, such printing apparatus discharges the ink on the printing medium in accordance with a supplied printing signal to print. Since the printing apparatus achieves low running cost and operates quietly, this printing apparatus is widely used.

Also, in a color printing apparatus, a printhead which discharges a plurality of color inks discharges the color ink droplets on the printing medium in an overlaying manner so as to form a color image. Generally, inks of three primary colors, i.e., yellow (Y), cyan (C), and magenta (M) are respectively stored in three ink cartridges, and inks of four colors obtained by adding black (K) to the three primary colors are respectively stored in four ink cartridges. The inks are supplied from these ink cartridges to the three or four printheads corresponding to these ink cartridges to print.

Recently, a head cartridge formed by integrating the printheads for discharging the four color inks and the ink cartridges is available. Also, in order to obtain a more high-quality image, the printing apparatus which prints by using seven color inks obtained by adding pale yellow (PY), pale cyan (PC), and pale magenta (PM) to the four colors, i.e., Y, M, C, and K colors is available.

Note that the printing apparatus includes a serial-scan-type printing apparatus and a line-head-type printing apparatus. In the serial-scan-type printing apparatus, a carriage to which the printheads are mounted is scanned in a certain direction (this direction is called a main scanning direction), the printing medium is conveyed in a direction perpendicular to the main scanning direction (this direction is called a sub-scanning direction) for each main scan, and an image is serially printed on the printing medium positioned on a platen. In the line-head-type printing apparatus, the full line printhead having a great number of printing elements is fixed in a direction perpendicular to the conveyance direction of the printing medium, and the image is printed on the printing medium conveyed on the platen.

The latter (line-head-type) printing apparatus includes a convey mechanism capable of continuously conveying the printing medium, and conveys the printing medium positioned under the fixed full line printhead to print, thereby printing at very high speed. However, since the line-head-type printing apparatus uses the full line printhead, the apparatus becomes large. Further, since the full line printhead is expensive, the apparatus becomes expensive.

To the contrary, the former (serial-scan-type) printing apparatus includes a convey mechanism capable of intermittently conveying the printing medium in accordance with the print width of the printhead, and prints by repeating the conveying operation of the convey mechanism and the printing operation of the printhead. Therefore, the serial-scan-type printing apparatus can be small and provided at low cost even though the printing speed is low (see Japanese Patent Publication Laid-Open No. 2002-103709).

Conventionally, the line-head-type label printer which can print at high speed is generally used. However, since the recent serial-scan-type label printer can also attain high printing speed by largely increasing the number of nozzles of the printhead, such a printing apparatus is used as a label printer by utilizing the advantage that the apparatus is small and provided at low cost.

FIGS. 13A to 13C are views showing a scenario in which the serial-scan-type label printer continuously prints a plurality of labels. FIGS. 13A to 13C are views of a label layout sheet viewed from a direction perpendicular to the main scanning direction of a printhead 300, and to a conveyance direction (sub-scanning direction) of the layout sheet on which labels 303 are stuck. In such continuous printing operations, after printing the first label, the label layout sheet is moved to a printing start position of the next label, then the printing operation for the next label is started.

FIG. 13A shows a state where a label layout sheet 302 is fed. In this state, the label layout sheet 302 on which the plurality of labels are stuck is fed and conveyed, and the leading end of the first label 303 reaches the position of a photo-transmission type of a TOF sensor 301. When the TOF sensor 301 senses the leading end of the label 303, the label layout sheet is temporarily stopped at this position. Then, printing information received from a host (not shown) is printed on the label 303 by repeating the conveyance of the label layout sheet and the scan of the carriage to which the printhead 300 is mounted.

FIG. 13B shows a state where the trailing end portion of the first label 303 has been printed, the printing of the first label 303 has been completed, and the leading end of the next label 304 is conveyed over the TOF sensor 301.

FIG. 13C shows a state before printing the printing information on the next label 304. The leading end of the label 304 is set at the printing position by conveying the label layout sheet 302 in a reverse direction from the state shown in FIG. 13B.

As described above, in a case where a plurality of labels are continuously printed, one of the following methods is generally used. (1) After printing on one label, the label paper sheet is moved to the printing start position of the next label to print on the next label. (2) A plurality of labels to be continuously printed are defined as one page, and the printing data of one page is transferred from a host (not shown) to print. (3) Blank data of a width corresponding to the interval between the labels is added between the plurality of labels to be continuously printed, the plurality of labels to be continuously printed are defined as one page, and the data is transferred from a host (not shown) to print.

However, in the prior art, in a case where the method (1) is employed, for example, when continuously printing on a plurality of labels arranged in a printable area, of a printing medium, by a single scan of the printhead as shown in FIG. 13B, the label layout sheet needs to be moved to the printing start position of the next label after printing on one label. Hence, the throughput of the printing operation may be badly reduced.

In a case where the method (2) is employed, a printing medium such as a label layout sheet on which a plurality of labels are stuck with adequate intervals cannot be used for printing. In a case where the method (3) is employed, the printing position may be shifted to the label position if the label interval does not match the convey control of the set label layout sheet.

SUMMARY OF THE INVENTION

Accordingly, the present invention is conceived as a response to the above-described disadvantages of the conventional art.

For example, a printing method according to the present invention is capable of printing printing information at a correct position without reducing a throughput even when continuously printing on a plurality of labels.

According to one aspect of the present invention, preferably, there is provided a printing method of printing an image, by a printhead, on labels stuck on a sheet with a predetermined interval, comprising: a first bitmapping step of receiving a raster image command from a host, and bitmapping raster data to a data buffer having a capacity capable of storing data for a single scan-printing by the printhead; a first discrimination step of discriminating whether or not raster data to be printed on a continuous plurality of labels can be bitmapped to the data buffer; a second bitmapping step of bitmapping data corresponding to a predetermined interval between the labels to the data buffer in accordance with a discrimination result at the first discrimination step; a second discrimination step of discriminating whether or not data for a single scan-printing by the printhead is bitmapped to the data buffer; and a printing step of printing by the printhead in accordance with a discrimination result at the second determination step.

Also, the present invention may be implemented in the form of a program described by a computer-executable code in order to execute the steps in the above printing method by a computer.

Also, the program may be stored in a computer-readable storage medium so as to be read by the computer.

As described above, the present invention can be also implemented in the form of the program and storage medium.

Also, the present invention can be applied to a printing apparatus such as a serial-scan-type label printer which can perform the above-described printing method.

More specifically, such a printing apparatus which prints an image on labels stuck on a sheet with a predetermined interval by a printhead, preferably comprises: a data buffer having a capacity capable of storing data for a single scan-printing by the printhead; reception means for receiving a raster image command from a host; first bitmapping means for bitmapping, to the data buffer, raster data based on the raster image command received by the reception means; first discrimination means for discriminating whether or not raster data to be printed on a continuous plurality of labels can be bitmapped to the data buffer; second bitmapping means for bitmapping data for a raster corresponding to a predetermined interval between the labels to the data buffer in accordance with a discrimination result of the first discrimination means; second discrimination means for discriminating whether or not data for a single scan-printing by the printhead is bitmapped to the data buffer; and printing means for printing by the printhead in accordance with a discrimination result of the second discrimination means.

Alternatively, such a printing apparatus which prints an image on a sheet with a predetermined interval by a printhead, preferably comprises: a data buffer having a capacity capable of storing data for a scan-printing by the printhead; reception means for receiving a raster image command from a host; first bitmapping means for bitmapping, to the data buffer, raster data based on the raster image command received by the reception means; first discrimination means for discriminating whether or not raster data to be printed on the sheet can be bitmapped to the data buffer; second bitmapping means for bitmapping data for a raster corresponding to a predetermined interval between images on the sheet to the data buffer in accordance with a discrimination result of the first discrimination means; second discrimination means for discriminating whether or not data for a scan-printing by the printhead is bitmapped to the data buffer; and printing means for printing by the printhead in accordance with a discrimination result of the second discrimination means.

In accordance with the present invention as described above, upon printing an image on labels stuck on sheet with a predetermined interval by using a printhead, a raster image command from a host is received, raster data is bitmapped to a data buffer having a capacity capable of storing data for a single scan-printing of the printhead, whether or not the raster data to be printed on a continuous plurality of labels can be bitmapped to the data buffer is discriminated, data for the raster corresponding to a predetermined interval between the labels is bitmapped to the data buffer in accordance with the discrimination result, whether or not the data for a single scan-printing of the printhead is bitmapped to the data buffer is discriminated, and printing is performed by scanning the printhead in accordance with a discrimination result.

More specifically, there is preferably provided the arrangement of the above solution means wherein the raster data is a plurality of color component data, the printhead is composed of a plurality of printheads corresponding to the plurality of color component data, and the data buffer can store each of the color component data.

Preferably, the printhead is an inkjet printhead, and the inkjet printhead includes an electrothermal transducer for generating thermal energy to be supplied to ink in order to discharge the ink by using the thermal energy.

Preferably, the plurality of color component data include at least yellow component data, magenta component data, and cyan component data.

Additionally, the printing apparatus preferably includes sensing means for sensing a leading end of the label.

Note that the plurality of printheads may be arranged along the scanning direction, or along a conveyance direction of the sheet.

When the plurality of printheads have the latter arrangement, preferably, the printheads are controlled to complete the printing operation by multipath printing. In this case, the data buffer includes a plurality of blocks to store each of the plurality of color component data for the multipath printing, and the printing-means prints by cyclically using the plurality of blocks.

The invention is particularly advantageous since printing information can be printed at a correct position of the label without reducing throughput even when continuously printing on a plurality of labels.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A, 13B, and 13C are views showing a scenario in which a plurality of labels are continuously printed by a serial-scan-type label printer.

DETAILED DESCRIPTION OF THE PREFERRED EMBODIMENTS

Preferred embodiments of the present invention will now be described in detail in accordance with the accompanying drawings.

Note that in an embodiment to be described below, a printer which uses an inkjet printhead will be described as an example.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Figure 1:
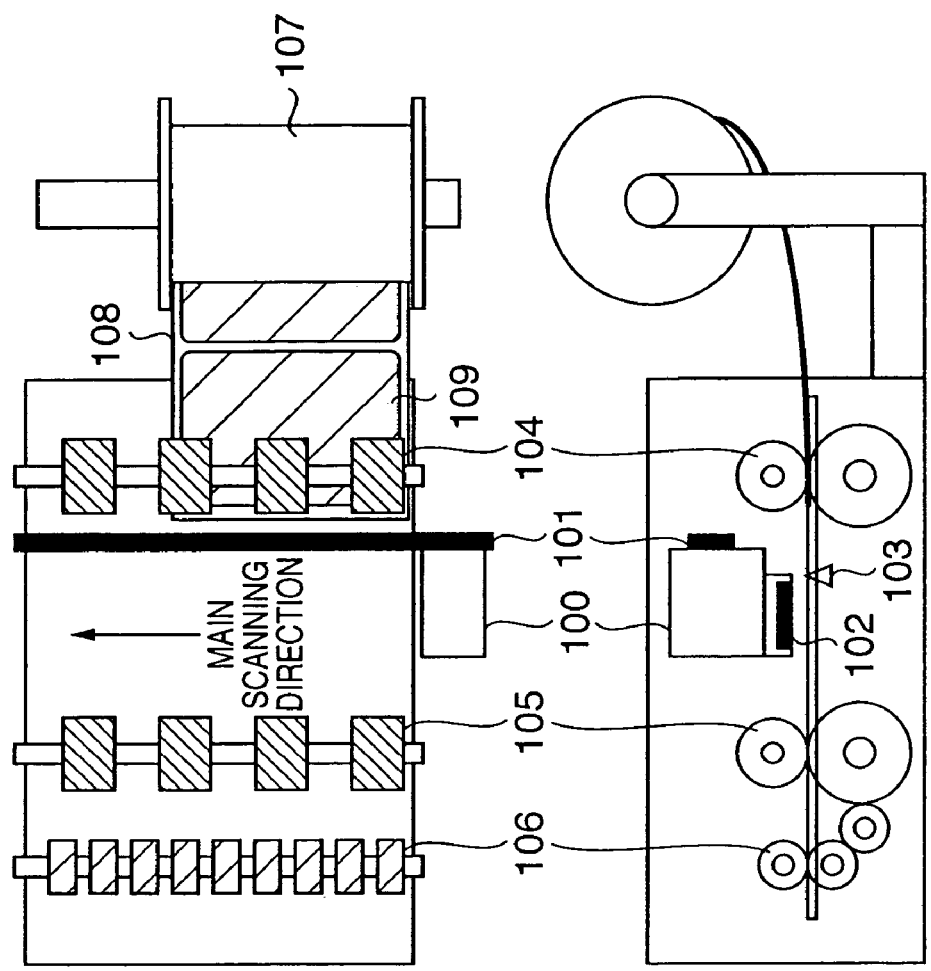
FIG. 1 shows a sectional top view and sectional side view of a serial-scan-type color label printer according to a typical embodiment of the present invention.

FIG. 1 shows a sectional top view and sectional side view of a serial-scan-type color label printer (to be referred to as a printer hereinafter) according to a typical embodiment of the present invention.

In this printer, a head cartridge 100, which is formed by integrating printheads 102 for discharging four color inks, i.e., Y, M, C, and K color inks and ink tanks for supplying the inks to the corresponding printheads 102, is mounted to a carriage.

Also, a roll-shaped label paper sheet 107 on which a plurality of labels 109 are stuck on a layout sheet 108 is attached to a paper feed unit. After the label paper sheet 107 is conveyed to a printing position 103 on a platen, the carriage is scanned in a main scanning direction by using a carriage moving belt 101 while discharging the ink from each printhead 102 to print on the label by a width corresponding to the print width of the printhead. After that, the label paper sheet 107 is conveyed by the width corresponding to the print width by using conveyance rolls 104 to 106. By repeating these printing and conveying operations, a color image for one label is printed.

Figure 2:
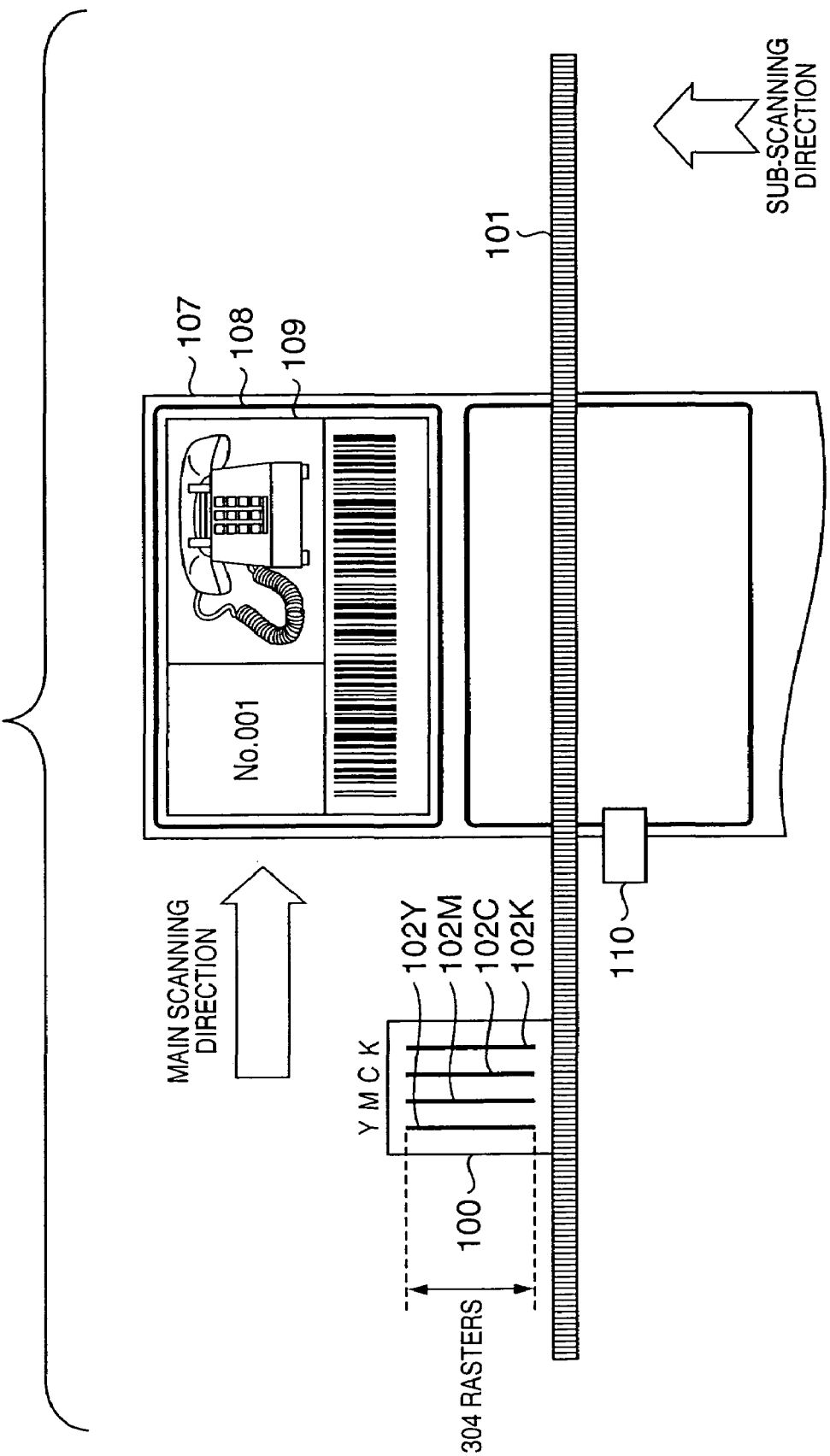
FIG. 2 is a view showing a schematic arrangement of a printing section of the printer.

FIG. 2 is a view showing a schematic arrangement of a printing section in the printer.

The printing section includes the carriage moving belt 101 which moves the carriage to which the head cartridge 100 is mounted in the main scanning direction. The head cartridge 100 is formed by integrating the printheads 102K, 102C, 102M, and 102Y which are arranged in parallel for respectively discharging four color inks, i.e., Y, M, C, and K color inks, and ink tanks for supplying the inks to these printheads. As shown in FIG. 2, in each of the printheads for the color inks, 304 ink orifices are arranged in one line at a constant pitch.

As described above, since the four printheads are arranged in parallel, an amount of one paper feed cycle is a width corresponding to 304 rasters. After the label paper sheet 107 is conveyed to the printing position on the platen, the carriage is scanned in the main scanning direction while discharging the color inks from the printheads 102K, 102C, 102M, and 102Y, thereby printing on the label by the width corresponding to 304 rasters.

In FIG. 2, reference numeral 110 denotes a TOF sensor which detects the leading end of the label.

Figure 3:
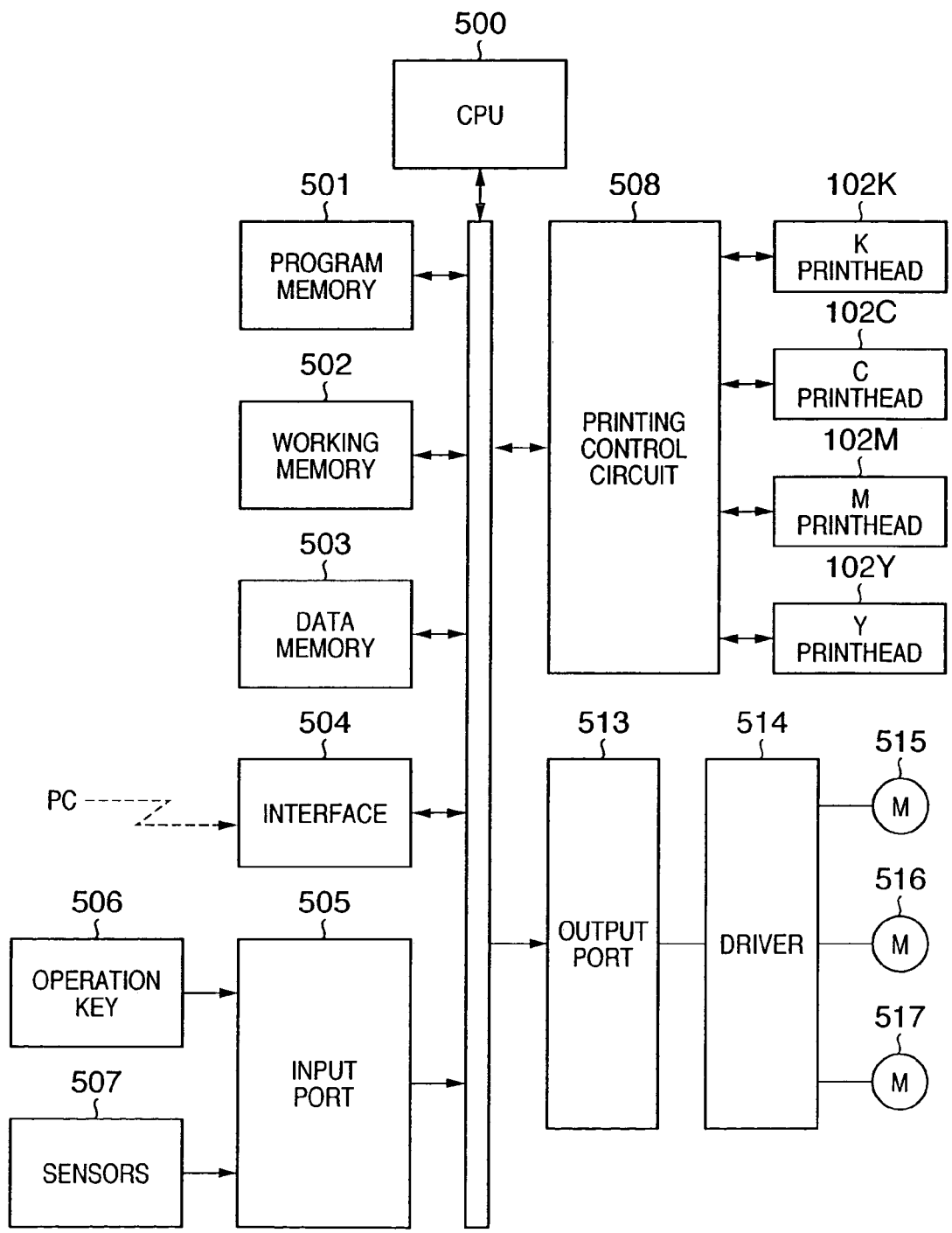
FIG. 3 is a block diagram showing a control arrangement of the printer.

FIG. 3 is a block diagram showing the control arrangement of the printer.

In FIG. 3, a CPU 500 reads out a control program stored in a program memory 501 such as a ROM, executes the program by using a working memory constituted by a RAM, receives printing data from a host computer (not shown, to be referred to as a host hereinafter) via an interface 504, and stores the printing data in a data memory 503 constituted by the RAM. Note that the program memory 501 stores, e.g., programs which correspond to the flowcharts shown in FIGS. 6, 7, 9, and 10.

Additionally, the CPU 500 drive-controls various motors 515 to 517 for the printing section, a paper feed section, and the like via a motor driver 514. Furthermore, the printheads 102K, 102C, 102M, and 102Y which discharge the four color inks are controlled via a printing control circuit 508. In this manner, the operations associated with the feed, conveyance and discharge of the printing paper sheet, and printing operations are controlled.

Note that various sensors 507 associated with the above operation control and an operation key 506 by an operator are also connected to the CPU 500.

Figure 4:
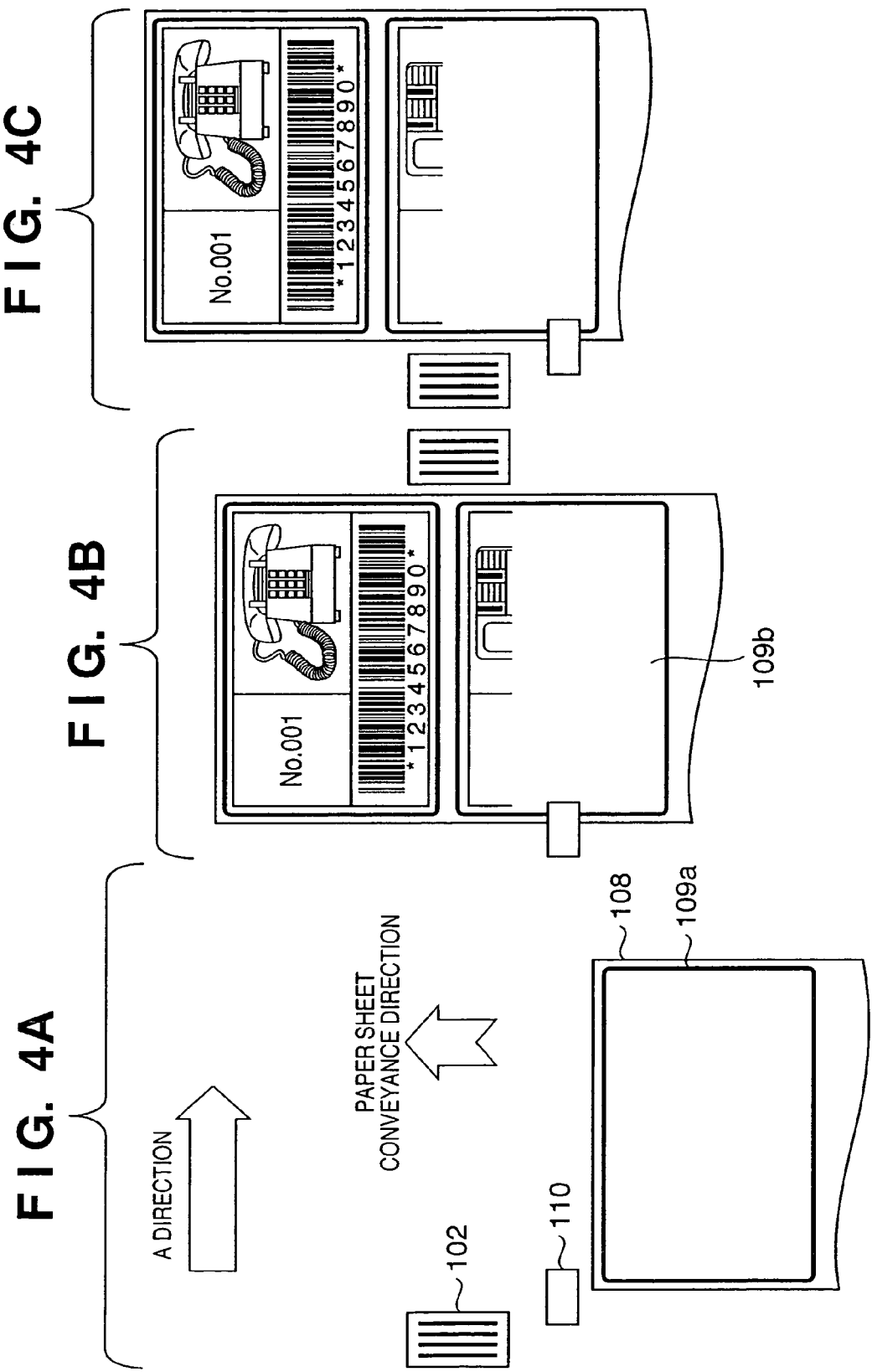
FIGS. 4A, 4B, and 4C are views showing a scenario in which a plurality of labels are continuously printed.

FIGS. 4A, 4B, and 4C are views showing a scenario in which a plurality of labels are continuously printed. FIGS. 4A to 4C are views of a label layout sheet viewed from a direction perpendicular to the main scanning direction of the printheads 102, and to a conveyance direction (sub-scanning direction) of the layout sheet on which labels are stuck.

In FIG. 4A, the label paper sheet that is the layout sheet 108 on which a plurality of labels are stuck is fed and conveyed. Then, the leading end of the label 109a reaches the position of a photo-transmission type of a TOF sensor 110. The TOF sensor 110 then senses the position of the label, and temporally stops conveying the label paper sheet.

In this embodiment, each time the printing data received from the host is stored in the data memory 503 for the 304 rasters corresponding to the print width of the printhead, the label paper sheet 107 is conveyed by the width corresponding to the 304 rasters, and the carriage is scanned once. In this way, the printing operation for one scan is repeated to print.

FIG. 4B shows a state where the image is printed by a single scan while forming a blank space between the trailing end of the first label 109a and the leading end of the next label 109b.

FIG. 4C shows a state where the label paper sheet is further conveyed by the width corresponding to the 304 rasters from the state shown in FIG. 4B.

Next, continuous label printing processing of the printer having the above arrangement will be described with reference to FIGS. 5 to 9.

Figure 5:
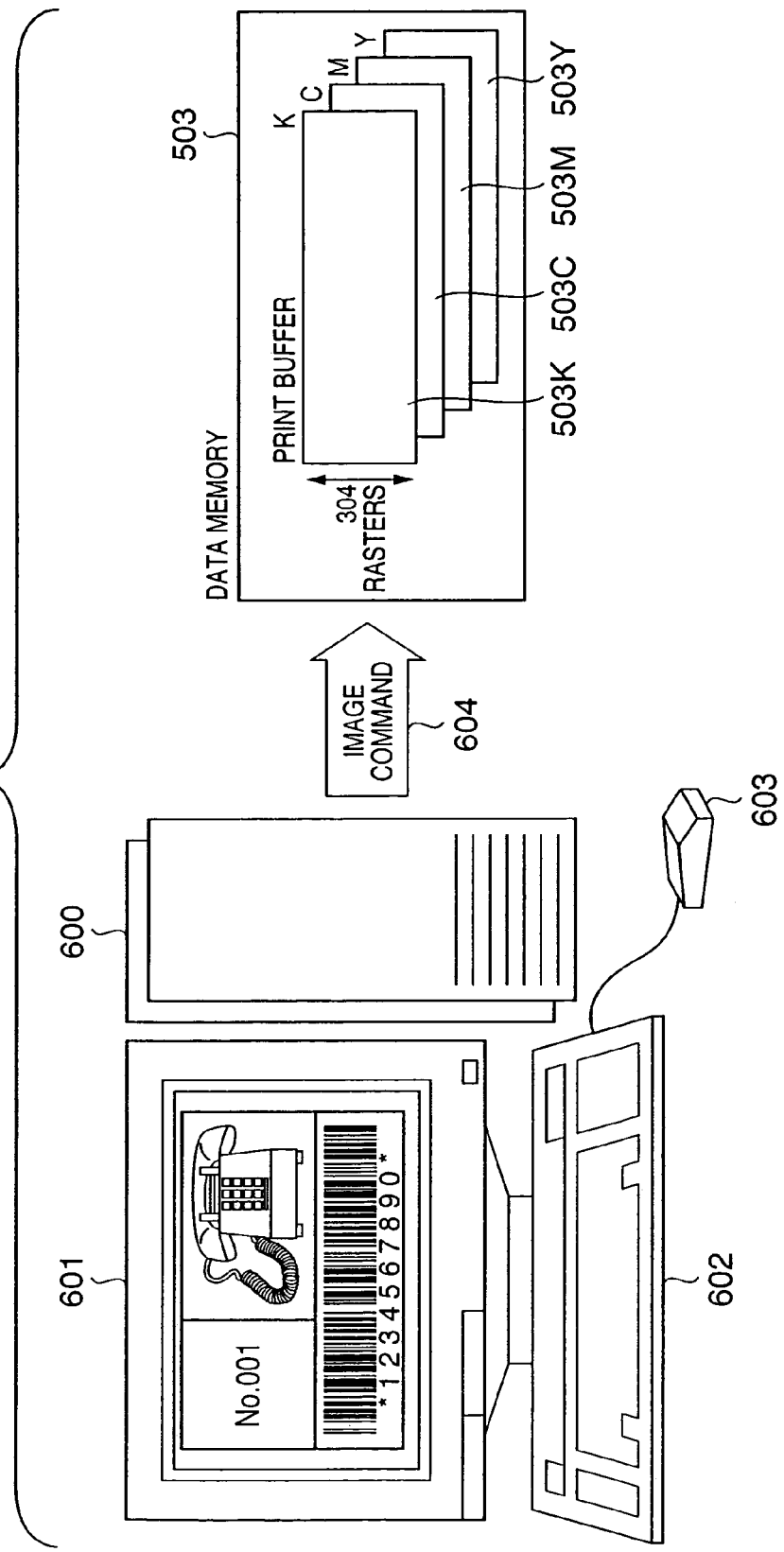
FIG. 5 is a view showing a concept of data bitmapping of the printer.

FIG. 5 is a view showing a concept of data bitmapping of the printer in this embodiment.

In FIG. 5, a raster image command transferred from a host 600 for each raster is bitmapped to the print buffers 503K, 503C, 503M, and 503Y which respectively store color component data, i.e., Y, M, C, and K color component data for a single scan-printing. These print buffers are arranged in the data memory 503 of the printer. When the image data for the 304 rasters corresponding to the print width of the printhead is stored, the label paper sheet is conveyed by a length corresponding to the 304 rasters, and printing is performed for the 304 rasters while moving the carriage. After this single scan-printing, the image data of the print buffers 503K, 503C, 503M, and 503Y are cleared to wait for reception of the next raster image command.

Note that the image which is printed in this case can be displayed on a display 601 of the host 600. After the printing image is previewed on the display screen, the printing operation can be instructed by using a keyboard 602 and mouse 603.

The operation of the above embodiment will be described below with reference to the flowchart of the continuous label printing processing.

Figure 6:
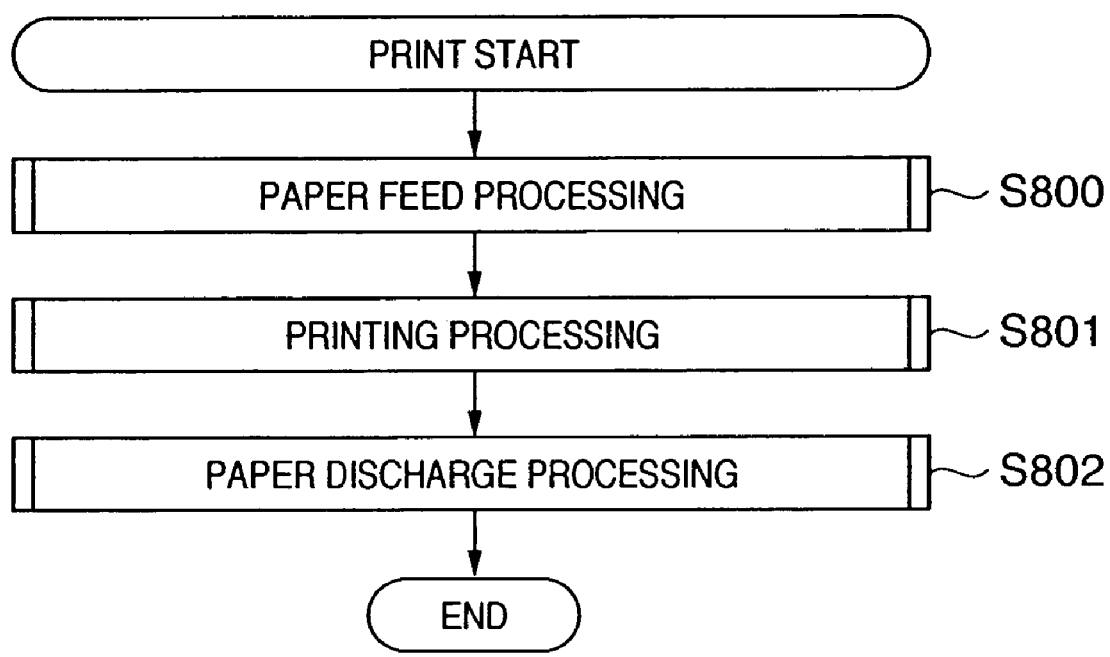
FIG. 6 is the most conceptual flowchart of a printing job performed by the printer.

FIG. 6 is the most conceptual flowchart of a printing job performed by the printer.

When the reception of a command including the printing information from the host 600 is started, the roll-shaped label paper sheet 107 is fed to the printing section under the control of the CPU 500 in step S800. After the feeding operation is completed, the received printing information is printed in step S801. After the continuous label printing processing is completed, the paper sheet is discharged in step S802.

The paper feed processing in step S800 will be described in detail below.

Figure 7:
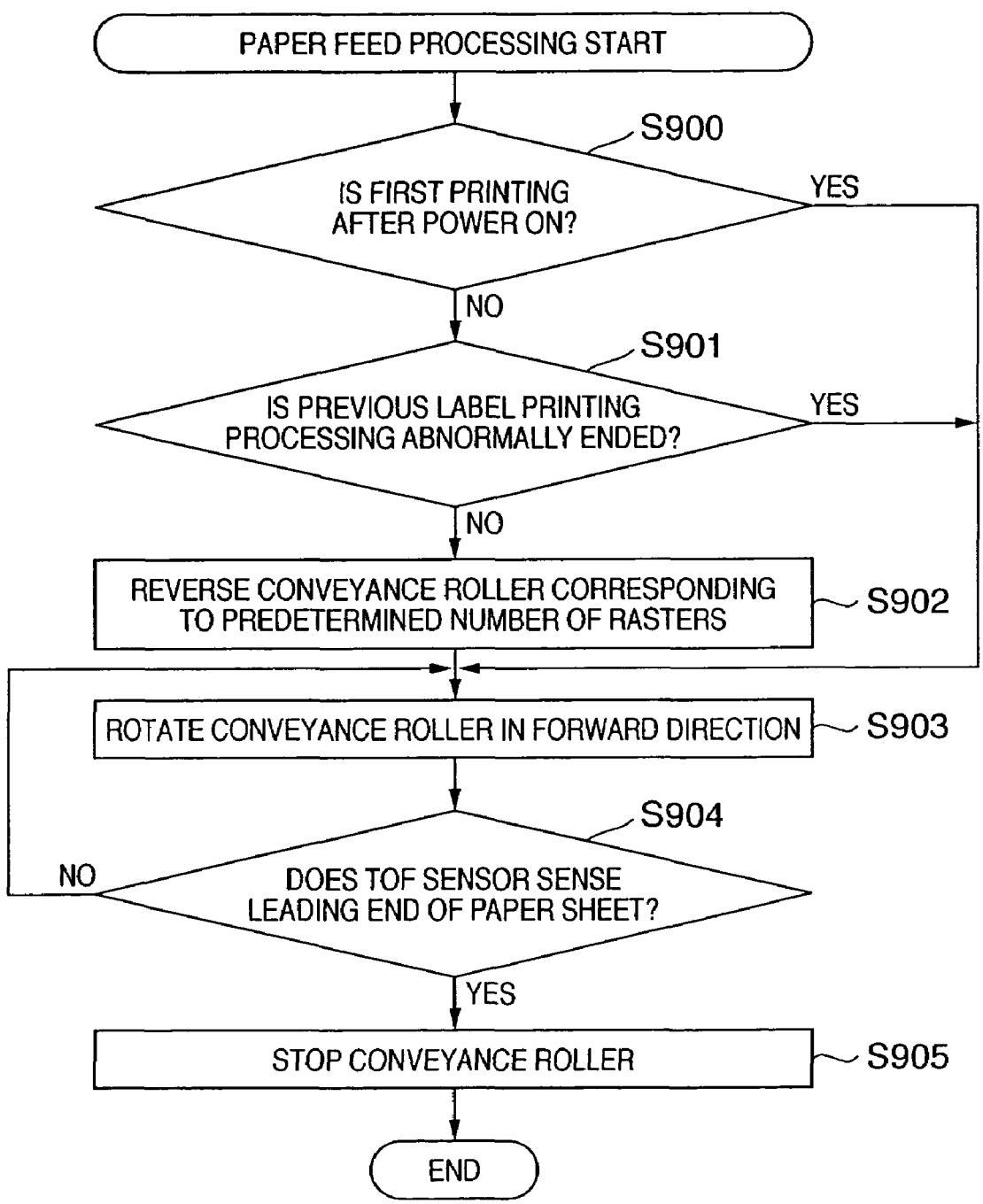
FIG. 7 is a flowchart showing paper feed processing in detail.

FIG. 7 is a flowchart showing paper feed processing in detail.

In step S900, the CPU 500 checks whether or not the printing processing is the first processing after the power is ON. If YES in step S900, the flow advances to step S903. If NO in step S900, the flow advances to the step S901 to check whether or not the previous label printing processing is abnormally ended.

Note that if YES in step S901, the flow advances to step S903. If NO in step S901, the flow advances to step S902 to reverse the rotation of the conveyance rollers, and rewind the label paper sheet 107 remaining within the printer, by the print width corresponding to a predetermined number of raster(s).

In step S903, the conveyance rollers are rotated in the forward direction to convey the label paper sheet 107. In step S904, the CPU 500 checks whether or not the TOF sensor 110 senses the leading end of the label paper sheet. The label paper sheet 107 is conveyed until the TOF sensor senses the leading end of the paper sheet.

When the TOF sensor 110 senses the leading end of the label paper sheet, the flow advances to step S905 to stop rotating the conveyance rollers and also stop conveying the label paper sheet.

Also, the printing processing in step S801 will be described in detail.

Figure 8:
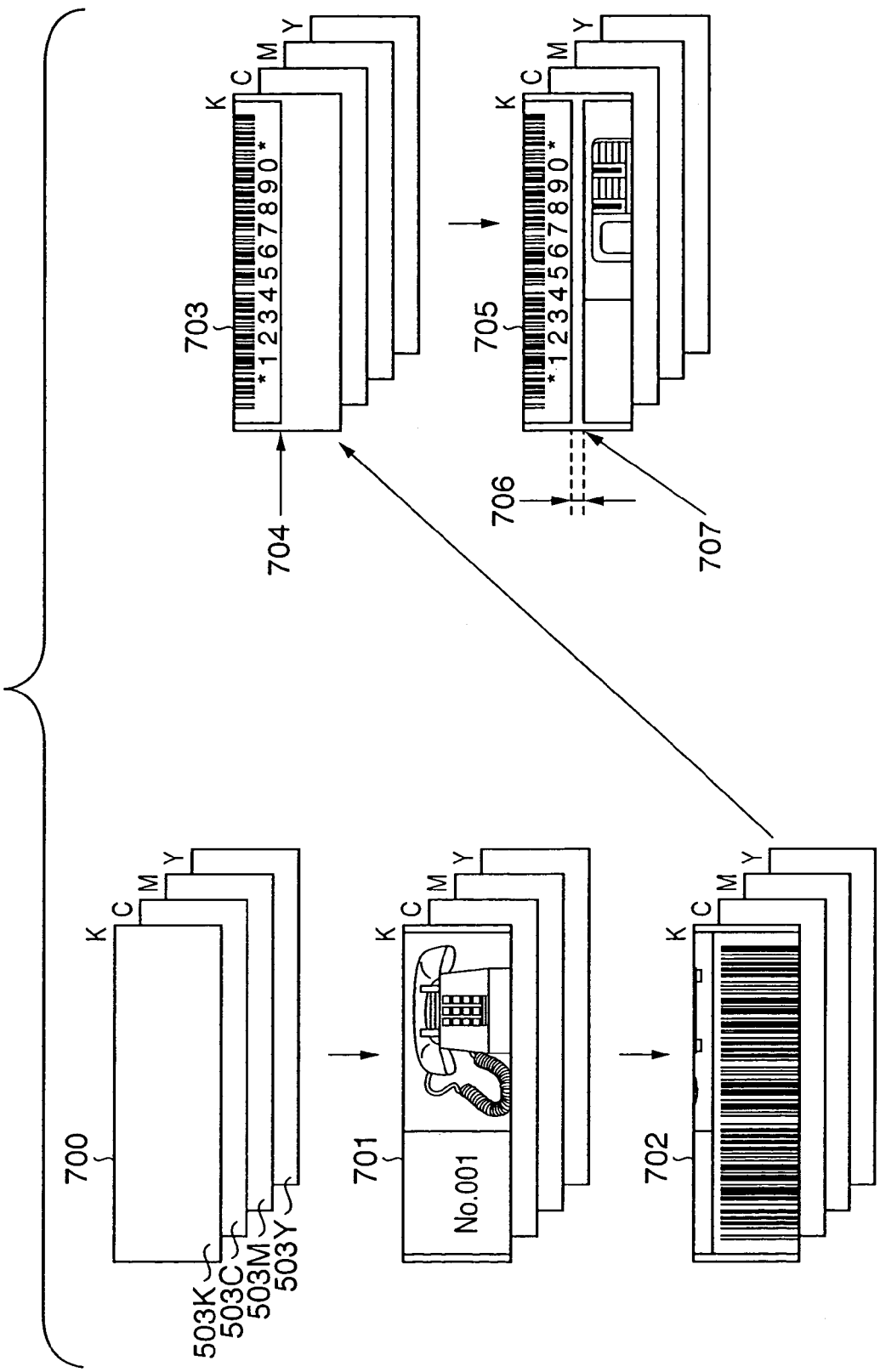
FIG. 8 is a view showing a transition of data bitmapping in a continuous printing operation of the plurality of labels performed by the printer.

FIG. 8 is a view showing a transition of data bitmapping in a continuous printing operation of a plurality of labels performed by the printer.

In this embodiment, a raster image command transferred from the host 600 raster by raster is bitmapped to the four print buffers corresponding to the color component data, i.e., Y, M, C, and K color component data to store the image data for 304 rasters. At this time, the label paper sheet 107 is conveyed by the print width corresponding to the 304 rasters, and the carriage is moved and scanned to print. Hence, the image is printed for each color component by the 304 rasters. After scanning the carriage and printing the image, the printed data in the print buffers are cleared to wait for the reception of the next raster image command.

In FIG. 8, reference numeral 700 denotes a state where these print buffers are cleared in initialization before printing. Reference numeral 701 denotes a state where a raster image commands corresponding to the 1st to 304th raster images of the leading end portion of the first label is bitmapped to the print buffers. In this state, the label paper sheet is conveyed by the print width corresponding to the 304 rasters to scan-print while moving the carriage. After the scan-printing, the data in the print buffers are cleared.

Reference numeral 702 denotes a state where a raster image command corresponding to the 305th to 608 the raster images of the first label is bitmapped to the print buffers. In this state, the label paper sheet 107 is conveyed by the 304 rasters to scan-print while moving the carriage. After this scan-printing, the data in the print buffers are cleared.

Also, reference numeral 703 denotes a state where a raster image command for N rasters from the 609th to the last (N rasters≦304 rasters) of the first label is bitmapped till the position represented by an arrow 704 of the print buffers. In this state, the label paper sheet 107 is conveyed by the 304 rasters, and the CPU 500 checks whether or not there exists data to be printed on the next label within a current scan-printable region.

In the example of a state denoted by reference numeral 705 shown in FIG. 8, since the data to be printed on the next label exists, the data bitmap position is skipped by L rasters corresponding to the label interval represented by an arrow 706. Furthermore, a raster image command used for printing the next label is bitmapped by (304-L-N) rasters from the address represented by an arrow 707. After the bitmapping is completed, the carriage is moved to scan-print. After that, the data in the print buffers are cleared.

By repeating the above control, a plurality of labels are sequentially printed.

Figure 9:
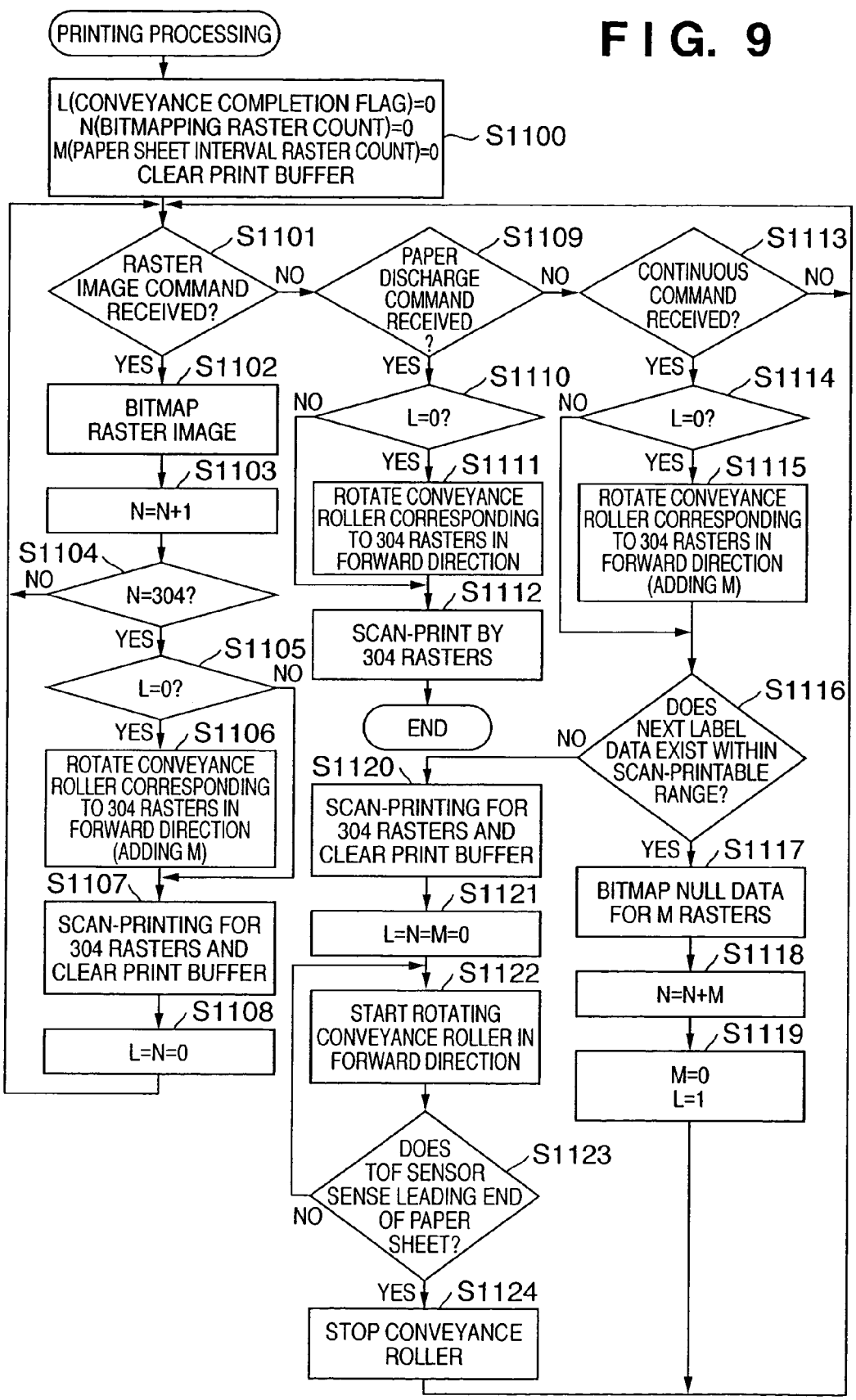
FIG. 9 is a flowchart showing printing processing in detail.

FIG. 9 is a flowchart showing printing processing in step S801 of FIG. 6 in detail.

First, in step S1100, the CPU 500 resets various variables used for the processing to zero, and clears the data in the print buffers, thereby performing initialization processing.

Next, in step S1101, the CPU 500 checks whether or not a reception command is a raster image command. If YES in step S1101, the flow advances to step S1102. If NO in step S1101, the flow advances to step S1109. In step S1102, the data is bitmapped to the print buffers. In step S1103, the value of bitmapping raster counter (N) is incremented by (+1). In step S1104, the CPU 500 checks the value of the raster counter (N). Note that if N=304, the flow advances to step S1105, and if N≠304, the flow returns to step S1101.

In step S1105, the CPU 500 further checks the conveyance completion flag (L). If L=0, the CPU 500 determines that the label has not been conveyed. Then, the flow advances to step S1106 to rotate the conveyance rollers in the forward direction so as to convey the label paper sheet 107 by the print width corresponding to the 304 rasters. Note that in the conveyance processing, the TOF sensor 110 measures the number of rasters corresponding to the absence of labels. The measurement value is added to the paper sheet interval raster counter (M). To the contrary, if L≠0, the flow advances to step S1107. The data for the 304 rasters are scan-printed, and the data in the print buffers are cleared. Furthermore, in step S1108, the values of N and L are cleared to zero. After that, the flow returns to step S1101.

Note that in step S1109, the CPU 500 checks whether or not the reception command is a paper discharge command. If YES in step S1109, the flow advances to S1110 to check the value of L. If L=0 in step S1110, the CPU 500 determines that the label has not been conveyed. Then, the flow advances to step S111 to rotate the conveyance rollers in the forward direction so as to convey the label paper sheet 107 by the print width corresponding to the 304 rasters. If L≠0, the flow skips step S1111. In step S1112, scan-printing for the 304 rasters is performed. Then, the printing processing is completed.

To the contrary, if the CPU 500 determines that the reception command is not a paper discharge command in the processing in step S1109, the flow advances to step S1113 to check whether or not the reception command is a continuation command. If YES in step S1113, the flow advances to step S1114 to check the value of L. If L=0, the CPU 500 determines that the label has not been conveyed, and the flow advances to step S1115. Then, the label paper sheet 107 is conveyed by the print width corresponding to the 304 rasters. During the period of this conveyance processing, the TOF sensor 110 measures the number of rasters corresponding to the absence of labels. The measurement result is added to M. On the other hand, if L≠0, the flow skips step S1115.

Then, in step S1116, as denoted by reference numeral 705 in FIG. 8, the CPU 500 checks whether or not there exists the data to be printed on the next label within the current scan-printable region. If NO in step S1116, the flow advances to S1120 to scan-print by the 304 rasters while moving the carriage. After that, in step S1121, the values of L, N, and M are reset to zero. In step S1122, the conveyance rollers are rotated in the forward direction to convey the label paper sheet 107. Furthermore, in step S1123, the TOF sensor 110 checks whether or not the leading end of the next label on the label paper sheet reaches.

If YES in step S1123, the flow advances to step S1124 to stop rotating the conveyance rollers so as to stop conveying the label paper sheet. After that, the flow returns to step S1101.

To the contrary, if YES in step S1116, the flow advances to step S1117. As represented by the arrow 706 in FIG. 8, null data for the M rasters between the labels is bitmapped. After that, M is added to N in step S1118, and the value of M is cleared to zero in step S1119. Since the conveyance for the next scan-printing has already been completed in step S1115, the value of "1" is set into L, then the flow returns to step S1101.

Figure 10:
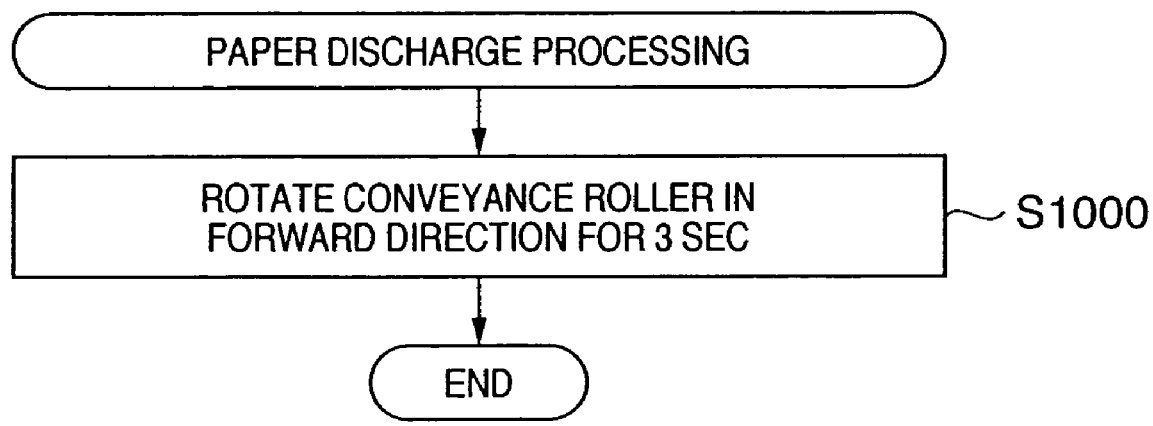
FIG. 10 is a flowchart showing paper discharge processing in detail.

FIG. 10 is a flowchart showing paper discharge processing in step S802 shown in FIG. 6 in detail.

In step S1000, the CPU 500 controls to rotate the conveyance rollers in the forward direction for 3 sec in order to discharge the printed label outside the printer.

Therefore, according to the above-described embodiment, in the continuous label printing processing, in a case where data of the trailing end portion of a label and data of the leading end portion of a subsequent label coexist in the print buffers, the null data is bitmapped as the raster data corresponding to the interval between these labels so as to form the blank portion for the label interval. Since the data is printed by a single scan of the carriage, the printing information can be printed on the correct position of the label paper sheet without reducing the throughput.

Other Embodiment

In the above embodiment, as shown in FIG. 2, an arrangement in which a plurality of printheads respectively discharging different color inks are arranged in the main scanning direction has been described. In this embodiment, continuous label printing processing in a case where a plurality of printheads respectively discharging different color inks are arranged in the sub-scanning direction will be described in reference with FIGS. 11 and 12.

Figure 11:
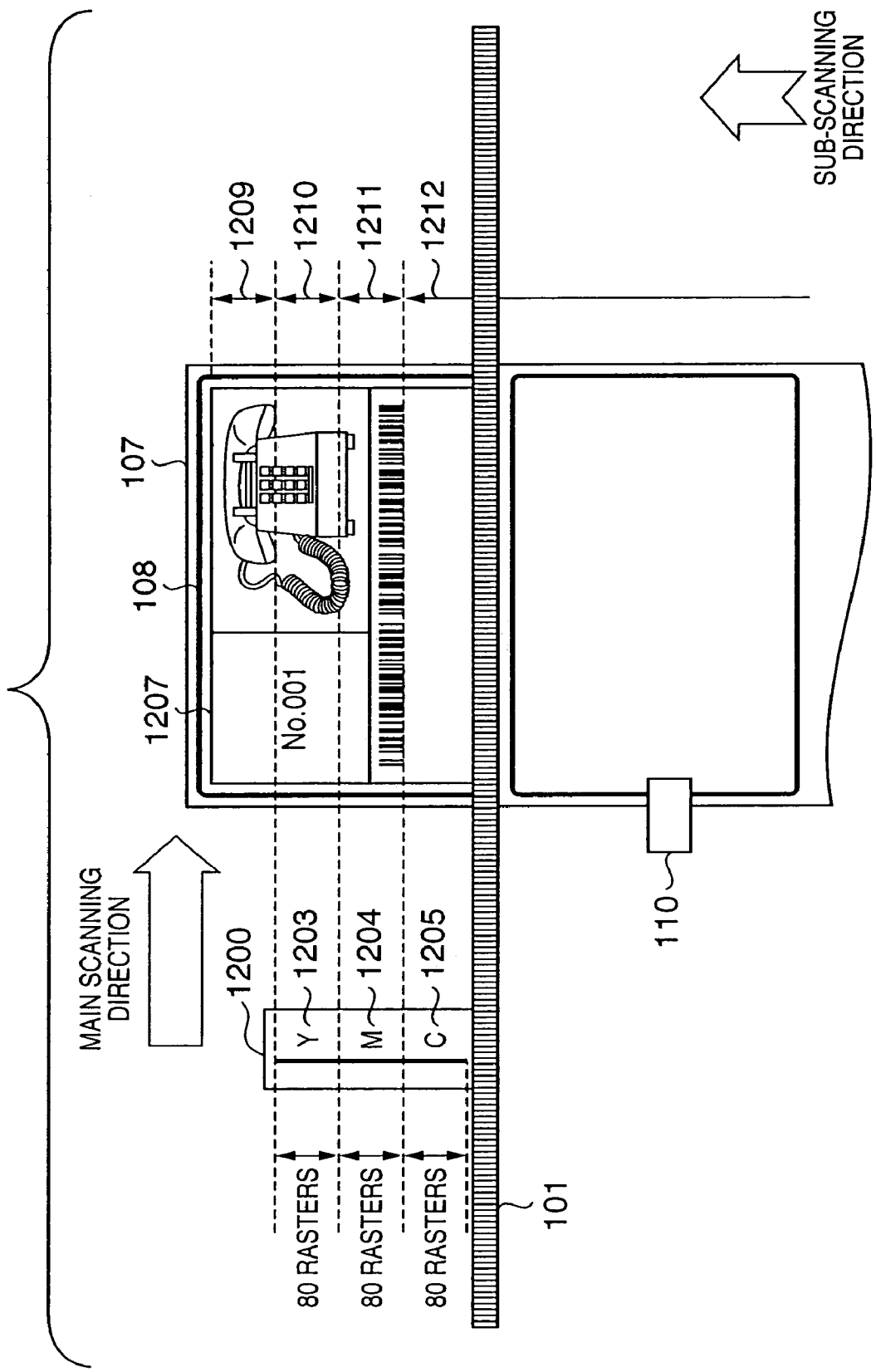
FIG. 11 is a view showing a schematic arrangement of a printing section of a printer according to another embodiment.

FIG. 11 is a view showing a schematic arrangement of a printing section of a printer according to this embodiment.

As shown in FIG. 11, in this embodiment, a head cartridge 1200 is used, which is formed by integrating three printheads 1203 to 1205 respectively discharging three color inks, i.e., Y, M, and C color inks arranged in the sub-scanning direction, and ink tanks which supply these inks to the corresponding printheads. Note that the same reference numerals as in the above-described embodiment denote the same elements in this embodiment, and a description thereof will be omitted. The printheads 1203 to 1205 are ink-jet printheads each of which has 80 orifices arranged in one line at a certain pitch.

In this embodiment, after a label paper sheet 107 is conveyed to a printing position on a platen, the carriage is moved in the main scanning direction while discharging the inks from the printheads 1203 to 1205 to print by the width corresponding to 80 rasters for each color ink. Since the three printheads are arranged in the sub-scanning direction, a single conveyance amount for a label is 80 rasters corresponding to the print width of one printhead.

During the period of this conveyance, the number of rasters (M) corresponding to the label interval is sensed as in the above embodiment. Since the printheads are arranged in the sub-scanning direction, in the printing processing shown in FIG. 11, there exist a portion 1209 printed by all of C, M, and Y inks, a portion 1210 printed by C and M inks, a portion printed 1211 by C ink only, and a no-printed portion 1212.

Figure 12:
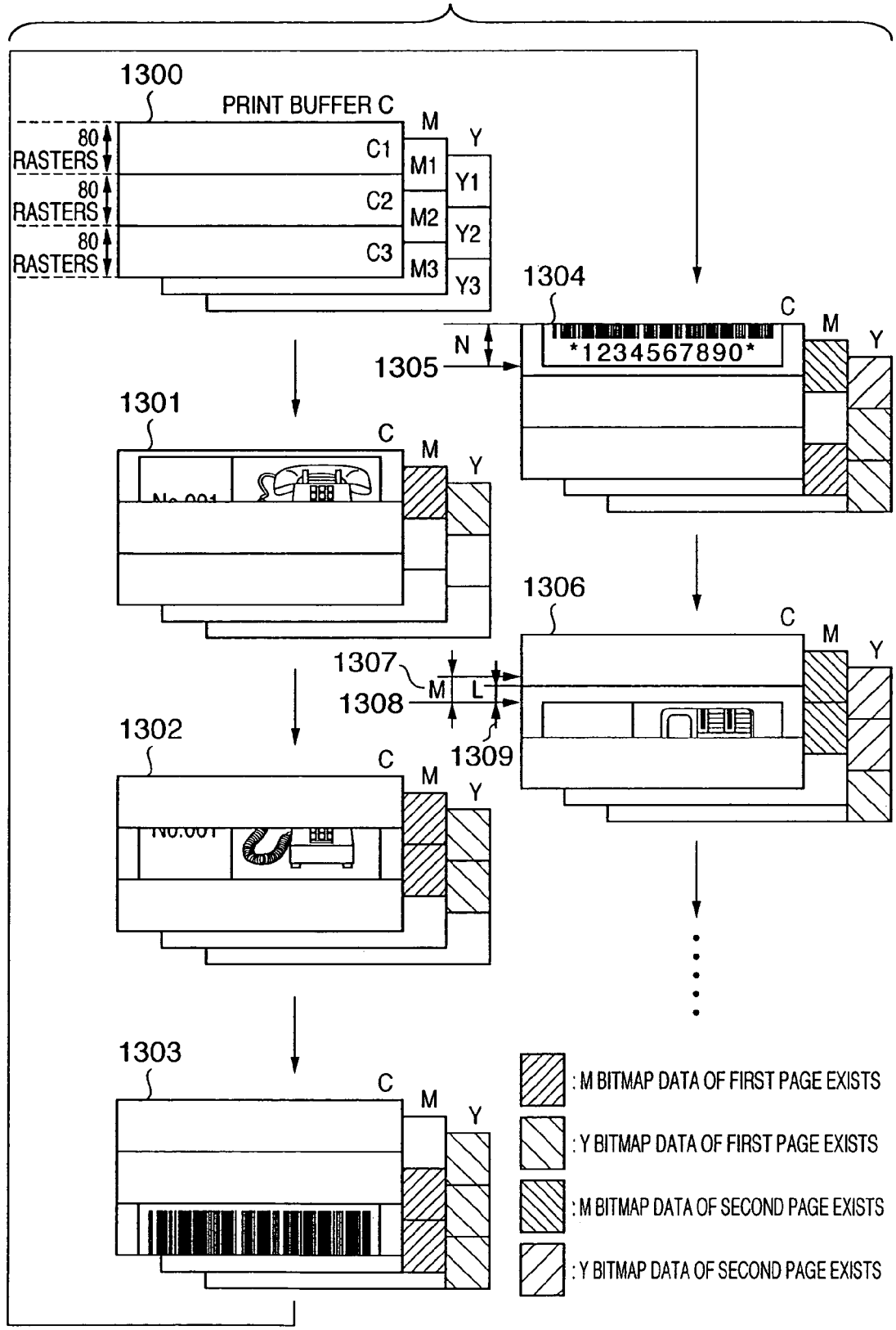
FIG. 12 is a view showing a transition of data bitmapping in continuously printing the plurality of labels by using the printer according to the embodiment in FIG. 11.

FIG. 12 is a view showing a transition of data bitmapping in continuously printing on a plurality of labels by using the printer according to this embodiment.

As indicated by reference numeral 1300 in FIG. 12, the printer includes three print buffers (1 to 3 blocks) each of which stores data of 80 rasters in correspondence with each of the C, M, and Y color inks. Reference numeral 1300 in FIG. 12 denotes a state where the print buffers are cleared in initialization before printing.

A raster image command transferred from a host raster by raster is interpreted to bitmap the image data corresponding to the C, M, and Y color inks to the print buffers. When the image data of 80 rasters (one block) is stored, the label paper sheet 107 is conveyed by the print width corresponding to the 80 rasters. The label paper sheet 107 is printed by the 80 rasters using the color inks, i.e., C, M, and Y color inks by moving the carriage for scan-printing. After that, the printed image data are cleared from the print buffers to wait for the reception of the next raster image command.

In FIG. 12, reference numeral 1301 denotes a state where a raster image command for 80 rasters corresponding to the 1st to 80th rasters which is the leading end portion of the first label is bitmapped to the first blocks of the print buffers (C1, M1, Y1). In this state, the label paper sheet 107 is conveyed by the print width corresponding to the 80 rasters to scan-print while moving the carriage. In this scan-printing processing, only data stored in the print buffer C1 is used. After this printing operation, the only data of the print buffer (i.e., C1) used for printing is cleared.

In FIG. 12, reference numeral 1302 denotes a state where a raster image command for 80 rasters corresponding to the 81st to 160th rasters of the first label is bitmapped to the second blocks of the print buffers (C2, M2, Y2). In this state, the label paper sheet 107 is conveyed by the print width corresponding to the 80 rasters to scan-print while moving the carriage. In this scan-printing processing, only data stored in the print buffers C2 and M1 are used. After this printing operation, the only data of the print buffers (i.e., C2 and M1) used for printing are cleared.

In FIG. 12, reference numeral 1303 denotes a state where a raster image command for 80 rasters corresponding to the 161st to 240th rasters of the first label is bitmapped to the third blocks of the print buffers (C3, M3, Y3). In this state, the label paper sheet 107 is conveyed by the print width corresponding to the 80 rasters to scan-print while moving the carriage. In this scan-printing processing, only data stored in the print buffers C3, M2, and Y1 are used. After this printing operation, the only data of the print buffers (i.e., C3, M2, and Y1) used for printing are cleared.

In FIG. 12, reference numeral 1304 denotes a state where a raster image command for N rasters (N rasters≦80 rasters) from the 241st raster to the last raster of the first label is bitmapped till the position represented by the arrow 1305 of the first blocks of the print buffers. In this state, the label paper sheet 107 is conveyed by the print width corresponding to the 80 rasters, and the CPU 500 checks whether or not the data to be printed on the next label exists within the current scan-printable range. In an example denoted by the reference numeral 1304 in FIG. 12, since the data to be printed on the next label does not exist, the scan-printing processing is continued while moving the carriage without any other bitmapping processing. In this scan-printing processing, the only data stored in the print buffers C1, M3, and Y2 are used. After this printing, the only data of the print buffers (i.e., C1, M3, and Y2) used for printing are cleared.

In FIG. 12, reference numeral 1306 denotes a state where the leading end portion of data used for printing on the second label is bitmapped to the second blocks (C2, M2, Y2) of the print buffers. In order to print by using the data stored in the remaining blocks of M and Y components in the state denoted by the reference numeral 1304 shown in FIG. 12, the label paper sheet 107 is conveyed by the print width corresponding to the 80 rasters. After that, the CPU 500 checks whether or not the data to be printed on the next label exists within the scan-printable region corresponding to the print buffer C2 denoted by the reference numeral 1306 shown in FIG. 12.

In the example denoted by reference numeral 1306 shown in FIG. 12, since such data exists, the bitmap position is skipped by L rasters as denoted by an arrow 1309 corresponding to the label interval calculated by an equation "$L=M-(80-N)$" from the start of the second block (null data is bitmapped to the skipped portion). After that, the data of the raster image command to be printed on the second label is bitmapped by (80−L) rasters from the position represented by an arrow 1308. When the data of the 80 rasters is stored in the second block of each of the print buffers (C2, M2, Y2), scan-printing processing is performed while moving the carriage. Note that in this scan-printing processing, the only data stored in the print buffers C2, M1, and Y3 are used. After this printing, the only data of the print buffers (i.e., C2, M1, and Y3) used for printing are cleared.

According to the above-described embodiment, when the three printheads in correspondence with the three color inks, i.e., C, M, and Y color inks, arranged in the sub-scanning direction are used for printing, the three print buffers arranged in correspondence with each of the three color inks, i.e., C, M, and Y color inks, are cyclically used. Data (null data) is bitmapped to the print buffers so as to form a blank portion corresponding to a label interval between data corresponding to the trailing end of a label and data corresponding to the leading end of a subsequent label. One block is selected from each of the three print buffers to print data of the selected block by a single scan-printing processing. Hence, the printing information can be printed to the correct position of the printing medium without reducing the throughput.

In the above embodiment, the present invention is implemented by the program. However, the present invention can be easily implemented by the hardware. Also, in each embodiment described above, the serial printer is used. However, the present invention can be easily implemented by the printer having a fixed head.

Further note that in the foregoing embodiments, although the description has been provided based on an assumption that a droplet discharged by the printhead is ink and that the liquid contained in the ink tank is ink, the contents are not limited to ink. For instance, the ink tank may contain processed liquid or the like, which is discharged to a printing medium in order to improve the fixability or water repellency of the printed image or to improve the image quality.

Each of the above-described embodiments comprises means (e.g., an electrothermal transducer or the like) for generating heat energy as energy utilized upon execution of ink discharge, and adopts the method which causes a change in state of ink by the heat energy, among the ink-jet printing method. According to this printing method, a high-density, high-precision printing operation can be attained.

Not only a cartridge type printhead in which an ink tank is integrally arranged on the printhead itself, as described in the above embodiment but also an exchangeable chip type printhead which can be electrically connected to an apparatus main unit and can receive ink from the apparatus main unit upon being mounted on the apparatus main unit is applicable to the present invention.

In addition, a printing apparatus according to the present invention may be used in the form of a copying machine combined with a reader, and the like, or a facsimile apparatus having a transmission/reception function, in addition to an integrally-provided or stand-alone image output terminal of a data processing equipment such as a computer.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing method of printing an image, by a printhead, on labels stuck on a sheet with a predetermined interval, comprising:
    a first bitmapping step of receiving a raster image command from a host, and bitmapping raster data to a data buffer having a capacity capable of storing data for a single scan-printing by the printhead;
    a first discrimination step of discriminating whether or not raster data to be printed on a continuous plurality of labels can be bitmapped to the data buffer;
    a second bitmapping step of bitmapping null data corresponding to the predetermined interval between the labels to the data buffer so as to form a blank portion for the label interval in a case where said first discrimination step discriminates that the raster data to be printed on the continuous plurality of labels can be bitmapped to the data buffer;
    a second discrimination step of discriminating whether or not data for a single scan-printing by the printhead is bitmapped to the data buffer; and
    a printing step of printing by the printhead in accordance with a discrimination result at said second discrimination step.

2. A printing apparatus which prints an image with a printhead on labels stuck on a sheet with a predetermined interval, comprising:
    a data buffer having a capacity capable of storing data for a single scan-printing by the printhead;
    reception means for receiving a raster image command from a host;
    first bitmapping means for bitmapping, to said data buffer, raster data based on the raster image command received by said reception means;
    first discrimination means for discriminating whether or not raster data to be printed on a continuous plurality of labels can be bitmapped to said data buffer;
    second bitmapping means for bitmapping null data for a raster corresponding to the predetermined interval between the labels to said data buffer so as to form a blank portion for the label interval in a case where said first discrimination means discriminates that the raster data to be printed on the continuous plurality of labels can be bitmapped to said data buffer;
    second discrimination means for discriminating whether or not data for a single scan-printing by the printhead is bitmapped to said data buffer; and
    printing means for printing by the printhead in accordance with a discrimination result of said second discrimination means.

3. The apparatus according to claim 2, wherein
the raster data is a plurality of color component data,
the printhead is comprised of a plurality of printheads corresponding to the plurality of color component data, and
said data buffer can store each of the color component data.

4. The apparatus according to claim 2, wherein
the printhead is an inkjet printhead.

5. The apparatus according to claim 4, wherein
the inkjet printhead includes an electrothermal transducer for generating thermal energy to be supplied to ink in order to discharge the ink by using the thermal energy.

6. The apparatus according to claim 3, wherein
the plurality of color component data include at least yellow component data, magenta component data, and cyan component data.

7. The apparatus according to claim 2, further comprising sensing means for sensing a leading end of the label.

8. The apparatus according to claim 3, wherein
the plurality of printheads are arranged along a scanning direction of the printhead.

9. The apparatus according to claim 3, wherein
the plurality of printheads are arranged along a conveyance direction of the sheet.

10. The apparatus according to claim 9, wherein
the printheads complete printing by multipath printing.

11. The apparatus according to claim 10, wherein
said data buffer includes a plurality of blocks to store each of the plurality of color component data for the multipath printing, and
said printing means performs printing by cyclically using the plurality of blocks.

* * * * *